Aug. 7, 1934.   J. E. MILES   1,969,091
MEASURING AND DISPENSING DEVICE
Filed Jan. 31, 1933   2 Sheets-Sheet 1

INVENTOR
James E. Miles
BY
Fred C. Matheny
ATTORNEY

Aug. 7, 1934.  J. E. MILES  1,969,091

MEASURING AND DISPENSING DEVICE

Filed Jan. 31, 1933  2 Sheets-Sheet 2

INVENTOR
James E. Miles
BY
Fred C. Matheny
ATTORNEY

Patented Aug. 7, 1934

1,969,091

UNITED STATES PATENT OFFICE 1,969,091

MEASURING AND DISPENSING DEVICE

James E. Miles, Bellevue, Wash.

Application January 31, 1933, Serial No. 654,466

7 Claims. (Cl. 221—113)

My invention relates to measuring and dispensing devices and the general objects of my invention are to provide a measuring and dispensing device which is simple in construction and which is reliable, efficient and accurate in operation.

Another object is to provide a measuring and dispensing device which may be made in various sizes and used for measuring and dispensing various materials, but which is especially well adapted for the measuring and dispensing of materials in small quantities as they are used, such as coffee, and the like in kitchens where inaccurate measuring means are liable to be used.

Another object of the invention is to provide a measuring and dispensing device of this nature which has a swingingly mounted cut-off valve positioned substantially opposite a pressure relief chamber which is never entirely full of material whereby said cut-off valve may push excess material into said pressure relief chamber as it operates thereby overcoming the tendency of said cut-off valve to pack the material and insuring an easy and smooth operation of the cut off valve regardless of the amount of material in the storage hopper of the device.

Other objects are to provide simple and efficient cam and lever means for controlling and operating a cut-off valve and a discharge valve; to provide simple and efficient means for adjusting the size of the measuring chamber whereby the amount of material measured and discharged at each operation may be varied; to provide efficient torsion spring means for returning the valves to their initial position and to provide a measuring and dispensing device of this nature which is relatively tight and prevents circulating air from contacting the material therein.

Other and more specific objects of the invention will be apparent from the following description taken in connection with the accompanying drawings.

In the drawings, Figure 1, is a fragmentary view in vertical section of a measuring and dispensing device constructed in accordance with my invention, showing the valves of the same in their normal inoperative position, the cut-off valve being open and the discharge control valve being closed.

Like reference numerals designate like parts throughout the several views.

Figure 1:
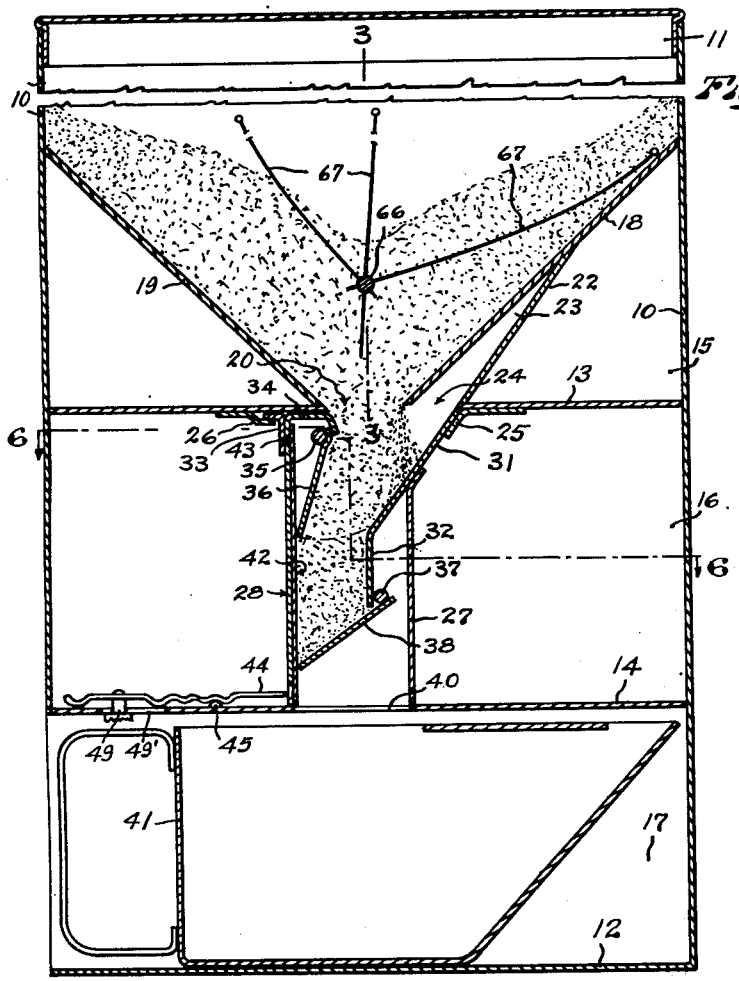

Referring to the drawings 10 designates a housing or receptacle, which is illustrated as rectangular in cross section but which may be of substantially any other shape desired. The open top end of the housing 10 may have a removable cover 11 and a bottom 12 may be provided in said housing. Two transverse walls 13 and 14 may be provided at different elevations in the housing 10 dividing the same into three compartments 15, 16 and 17. The upper compartment 15 is in the nature of a receptacle for material and is provided at its lower portion with hopper forming side walls 18 and 19 which converge toward the center and leave a slot 20 through which material may pass downwardly. Inclined end walls 21 may cooperate with the inclined side walls 18 and 19 in forming the hopper. Another inclined pressure relief chamber wall 22 extends from the transverse wall 13 in a generally upward direction and converges toward the hopper bottom wall 18 and cooperates with said hopper bottom wall 18 to form a pressure relief chamber 23 which is open at the bottom as at 24. This pressure relief chamber constitutes an important feature of this invention. Two guide members 25 and 26 are secured to the bottom side of the transverse wall 13 for slidably receiving and holding a removable measuring and dispensing unit.

The measuring and dispensing unit comprises a rectangular receptacle formed of side walls 27 and 28 and end walls 29 and 30. An inclined wall 31, having a slope which corresponds to the slope of the wall 22 is secured to the upper edge of the side wall 27 which side wall 27 terminates below the upper end of the measuring and dispensing unit. The wall 31 extends upwardly flush with the top plane of the measuring and dispensing unit and also extends downwardly at an incline into the measuring receptacle or chamber and terminates in a downwardly extending substantially vertical lower portion 32. An angle member 33 having an outwardly extending flange is secured to the upper edge of the wall 28. The measuring and dispensing unit is inserted and removed from one side of the housing 10 by slidably engaging the angle member 33 and the upper edge of the inclined wall 31 with the respective guide members 26 and 25.

The top edge of the wall 28 extends inwardly and thence downwardly as indicated at 34 to afford a cover and shield for a transverse shaft 35 to which a cut-off valve or gate 36 is rigidly secured. The lower end portion 32 of wall member 31 forms a similar guard and shield for another transverse shaft 37 to which a discharge valve or gate 38 is rigidly secured. An opening 40 is provided in the wall 14 at the bottom of the measuring and dispensing unit and a receptacle 41 may be provided for insertion into and removal from the lower compartment 17 to receive the measured material which is discharged by the measuring and dispensing unit. This receptacle may be shaped so that finely divided material may be readily poured out of the same without danger of spilling.

Figure 8:
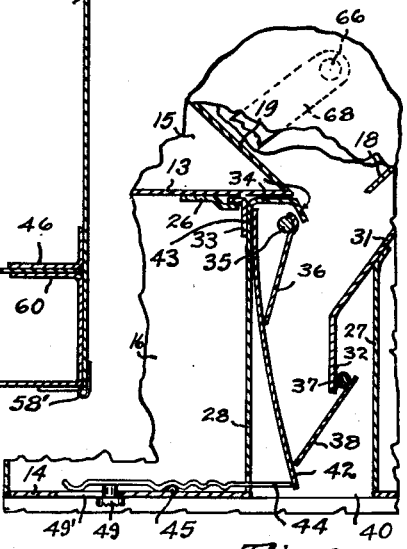
Fig. 8 is a fragmentary section showing an operative position of a device for adjusting the volume of the measuring chamber.

To adjust the capacity of the measuring compartment, I may provide in one side thereof adjacent the wall 28, a resilient false side 42 having its top end rigidly secured, as by soldering, brazing or welding the same, to the upper portion of the wall 28, as indicated at 43. The bottom portion of the false side 42 is adjustably supported as by a resilient slide 44 which rests on partition 14 and is held in adjusted position by knob and recess form of detent means 45. A finger piece 49 extends down through a slot 49' in the wall 14 and may be reached through the open end of compartment 17 whereby the slide 44 may be moved to adjust the bottom end of the false side, Fig. 8, and thereby vary the capacity of the measuring compartment.

One end wall 29 of the measuring and dispensing unit is wide enough to extend substantially across the housing 10. The ends of this wall 29 rest against upright ledges 46 and the operating cams and levers may be positioned adjacent this end wall 29. These cams and levers comprise a lever 47 secured on the end of shaft 35 and having a cam surface 48 for engagement with a cam section 50 of a main cam lever 51. Another cam lever 52 secured on shaft 37 has two lugs 53 and 54 for engagement by the cam section 50 of lever 51. The lever 51 is fulcrumed at 55 and has an operating handle 56 which extends out through an arcuate slot 57 in a side plate 58 which may be hinged as at 58' and has inwardly protruding foot portions 60 which press against the end wall 29 and help to secure the measuring and dispensing unit in the proper position in the housing. Any suitable fastening means, as a screw 59 may secure the non-hinged edge of the plate 58 to the housing.

Figure 2:
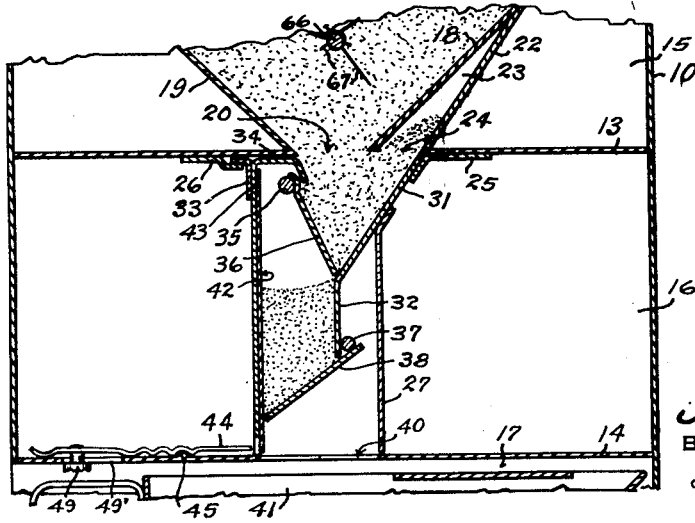
Fig. 2 is a fragmentary cross section of the same showing the cut-off valve in a closed position which it may occupy just prior to the opening of the discharge valve and also showing the discharge valve closed.
Figure 4:
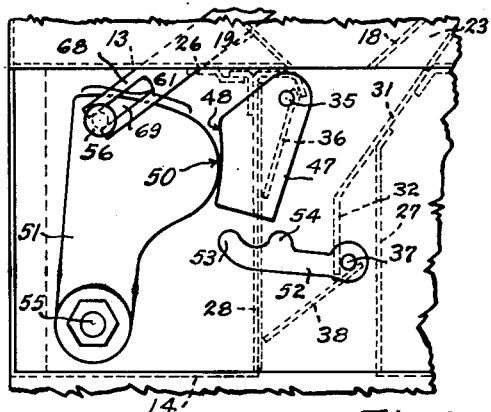
Fig. 4 is a fragmentary elevation with side plate removed, showing the operating cams and levers in their normal inoperative position, parts being shown by dotted lines.

By grasping the handle 56 and moving the same to the right from the position shown in Fig. 4 the shut-off valve 36 will first be moved from the open position shown in Fig. 1 to the closed position shown in Fig. 2. In this portion of the operation the lower edge of the said shut-off valve 36 will swing on the arc of a circle from the wall 28 to the wall 31 thus cutting off the material from the measuring chamber and pushing the excess material up into the expansion space or chamber 23 and leaving an accurately measured amount of material in the measuring chamber. When the cut-off valve 36 reaches the closed position shown in Fig. 2, it will be held closed but will not be moved any farther by further movement of lever 51, due to the fact that the cam surface 48 on the lever 47 will be in engagement with an arcuate cam section 61 of the lever 51 which cam section 61 is an arc of a circle having the pivot 55 as its center. At about the time the cut-off valve 36 reaches the closed position, during movement of the lever 51 in a clockwise direction as respects the showing in Fig. 2, the cam surface 50 will engage the lug element 53 and begin to open the discharge control valve 38. This opening movement of the discharge control valve 38 will at first be slow but upon further clockwise movement of the lever 51 the cam surface 50 will engage the lug element 54 and quickly move said discharge valve to a wide open position thus permitting all of the material in the measuring compartment to discharge.

Figure 6:
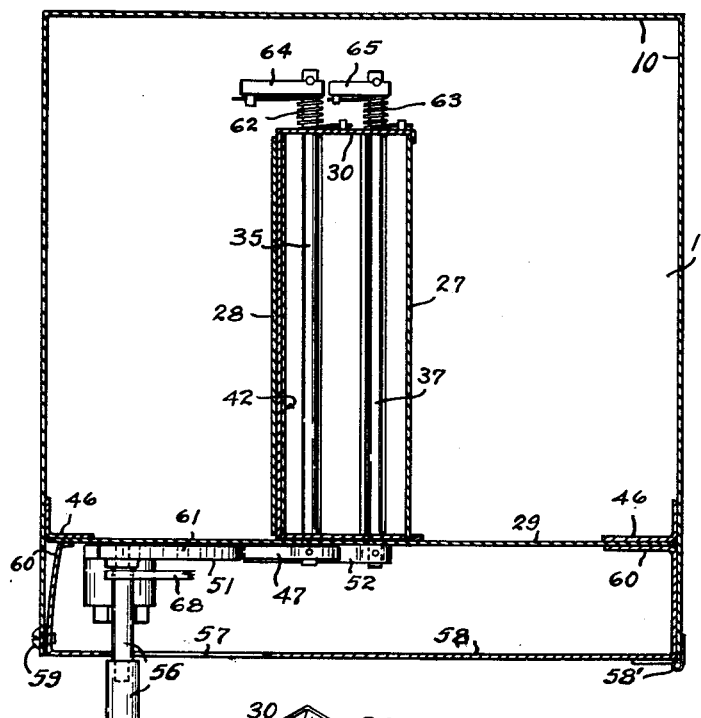
Fig. 6 is a horizontal cross section substantially on broken line 6—6 of Fig. 1.
Figure 7:
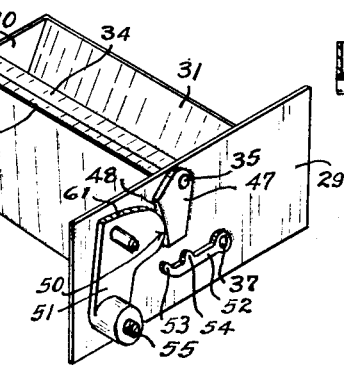
Fig. 7 is a detached perspective view on a smaller scale of the measuring and dispensing assembly as it may appear when removed from the main housing.

For the purpose of returning the cut-off valve 36 to its open position and the discharge control valve 38 to its closed position, I preferably provide two torsion springs 62 and 63 disposed on the respective shafts 35 and 37 at the opposite end of the measuring and dispensing unit from the cams and levers. The springs 62 and 63 each have one end secured to the end wall 30 of the measuring and dispensing unit and the other end connected respectively with lever arms 64 and 65 which are secured on the shafts 35 and 37 so that both of said springs exert a torque tending to close the valves 36 and 38. The torque thus exerted also acts through the levers 47 and 52 to return the lever 51 to the normal inoperative position. Turning movement of the members 36 and 38 is limited by engagement of the lower ends of said members with the false side 42. The helical torsion springs 62 and 63 also function as compression springs exerting an end thrust between the end wall 30 and the lever arms 64 and 65 to take up end play which might otherwise occur in shafts 35 and 37. The expansion of these springs also holds the lever arms 64 and 65 in close contact with cross pins or keys, Figs. 6 and 7, which extend through the shafts 35 and 37 and lie within grooves in the lever arms 64 and 65. This provides mechanism which is easily assembled and by which the springs may readily be placed under torsion and by which the torsion of said springs adjusted as desired.

The two swinging valves 36 and 38 are the only moving parts which come in contact with the material and as these valves are pivotally mounted and swing freely there is little danger of the material getting into their bearings or joints and interfering with the operation of the same. This measuring and dispensing device is especially well adapted for dispensing materials in small lots as they are used in the kitchen, as coffee, and the like. The material to be measured and dispensed, as ground coffee, is placed in the receptacle 15, which may be as large as desired to afford any required amount of storage space. Normally the cut off valve 36 will be open and the discharge control valve 38 will be closed so that the material will run down and fill the spaces in the measuring and dispensing unit and rest on the discharge control valve 38, as shown in Fig. 1. In this normal inoperative position the material opposite the valve 36 at the location of the opening or mouth 24 of the pressure relief chamber 23 will assume a line substantially as shown in Fig. 1.

Figure 3:
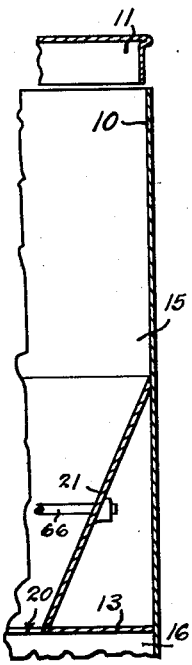
Fig. 3 is a fragmentary sectional view substantially on broken line 3—3 of Fig. 1, showing an end wall of the hopper.

To operate the device and discharge a measured quantity of material the operator places the hand on the handle 56, moves the lever 51 to the right from the position shown in Fig. 3, as far as it will go and then either returns the lever 51 to its initial position or releases said lever and permits it to be returned by the action of the springs 62 and 63. As the lever 51 is moved to the right it will first move the cut-off valve 36 to closed position and in so doing will move the material alongside of it sidewise into the pressure relief chamber 23 without packing or wedging said material or without producing any undesirable stiffness of operation and will leave an accurately measured amount of material in the measuring chamber. After the cut-off valve 36 is closed or near enough closed so as to cut off the down flow of material from above, the discharge control valve 38 is opened and thus permits the accurately measured quantity of material to discharge. When the lever 51 is released or is moved back toward the initial position the discharge control valve 38 will first move back to closed position while the cut-off valve 36 remains closed, after which the cut-off valve 36 will open and permit material to again fill the measuring chamber. As the cut-off valve 36 moves toward open position the material which has previously been pushed upwardly into the pressure relief chamber 23 will move down the inclined wall 31 and drop into the measuring chamber and other material from the storage chamber 15 will complete the filling of the measuring chamber and the material opposite the cut-off valve 36 will again assume a line substantially as shown in Fig. 1, so that it may be pushed, easily and without wedging or packing, into the pressure relief chamber when the valve members are again operated. The provision of the pressure relief chamber 23 is an important feature of the invention because it obviates the necessity of pushing any material back up into the main body of material in the hopper when the cut-off valve is operated, thus preventing undue packing of the material and making for ease and smoothness of operation. It will be noted that this pressure relief chamber 23 is substantially opposite to the cut-off valve 36 so that the excess material may be easily pushed thereinto. Also, the slope of the walls 31 and 22 is steeper than the slope of the hopper wall 18 so that material which is pushed into the pressure relief chamber 23 will run down more readily than the main body of material and will never tend to remain in and obstruct or fill up the pressure relief chamber.

If the device is to be used as a coffee measuring device in the kitchen, the measuring chamber may be adjusted to hold a table spoon full. The lever 51 will then be oscillated once for each table spoon full desired and the user may be assured of an accurate measurement of the required amount of material. All joints, bearings and connections in the device are relatively tight so that very little air will have access to the interior of the device thus safeguarding the material against deterioration. The device is free from sliding parts and for this reason the tendency of fine material to obstruct operation is reduced to a minimum.

Figure 5:
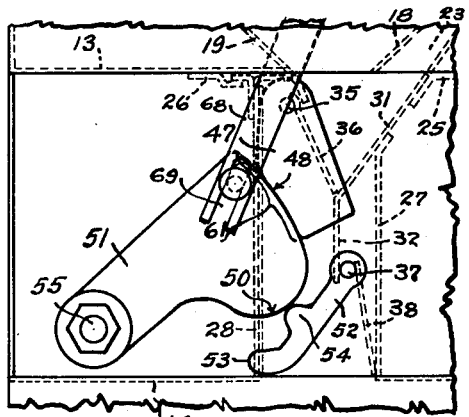
Fig. 5 is a view similar to Fig. 4 showing the cams, valves and levers in the discharging position.

To insure that the material in the hopper will all feed down evenly I preferably provide agitator means. This may be in the nature of a transverse agitator shaft 66 mounted a short distance above the outlet 20 and having agitator wires, preferably of spring steel secured thereto and extending upwardly and sidewise in the hopper, said agitator wires being designated by 67. The agitator shaft 66 may be journaled in the end walls 21, Fig. 3, and the end of said shaft opposite to the one shown in Fig. 3 may have a lever arm 68 secured thereto, see Fig. 8, which lever arm is positioned between the end wall 21 and the adjacent side wall of the housing and extends down into the compartment in which cam and lever operating mechanism is disposed. The lower end of the lever arm 68 has a longitudinal slot 69 therein, which slot 69 fits over the operating handle 56, as shown in Figs. 4 and 5, whereby the agitator shaft may be oscillated. When the front plate 58 is removed the cam lever 51 may be moved to the left until it strikes against the wall of the housing. When this is done the agitator lever 68 will be released from the member 56 and may be left free so that the agitator is disconnected and will not operate, this being a condition that may be desirable when a free feeding material is being used. The agitator may thus be used or disconnected, as desired. I find that the agitator is desirable when finely powdered coffee is being dispensed.

The foregoing description and accompanying drawings clearly disclose a preferred embodiment of my invention, but it will be understood that this disclosure is merely illustrative and that such changes may be made as are fairly within the scope of the following claims.

I claim.

1. In a measuring and dispensing device, a housing having an upper material storage compartment provided with a hopper shaped lower end and having an outlet opening in the bottom of said hopper shaped lower end; guide means carried by the housing and extending horizontally of the bottom of said hopper shaped lower end at opposite sides of said outlet opening and a measuring and dispensing unit slidably held by said guide means for transverse movement relative to the bottom of said hopper whereby said measuring and dispensing unit may be quickly and easily withdrawn from and replaced within said guide means.

2. In a measuring and dispensing device, a housing having an upper material storage space provided with a hopper shaped lower end and having an outlet opening in the bottom of said lower hopper shaped end; a measuring and dispensing unit having a compartment registering with the opening in the bottom of said housing; a swingingly mounted cut-off valve in the upper portion of said compartment; spring means urging said cut-off valve into open positions; a swingingly mounted discharge control valve in the lower portion of said compartment whereby a measuring compartment is formed between said two valves; spring means urging said discharge control valve into closed position; two lever means connected with the pivotal mountings of said valves respectively external to said compartment, and cam means movable in the path of said two lever means and arranged to engage and move first the lever which is connected with said cut-off valve and then the lever which is connected with said discharge control valve.

3. In a measuring and dispensing device, a hopper having an opening in the bottom thereof; a measuring and dispensing unit positioned below said hopper and having a compartment provided with a open top end registering with said opening in the bottom of said hopper; a swingingly mounted cut-off valve positioned near the upper end of said compartment and movable to obstructing position as respects the flow of material to the lower portion of said compartment; spring means urging said cut-off valve into open position; a swingingly mounted discharge control valve positioned near the discharge end of said compartment; spring means yieldingly urging said discharge control valve closed; a lever connected with the pivotal mounting of said cut-off valve; another lever connected with the pivotal mounting of said discharge control valve and a cam means movable in the path of both of said levers and positioned to successively engage said levers whereby said valves may be successively moved from one position to another.

4. In a measuring and dispensing device, a hopper having an opening in the bottom thereof; a measuring and dispensing unit positioned below said hopper and embodying, a compartment having an open top end registering with the opening in the bottom of said hopper, a swingingly mounted cut-off valve pivotally supported near the upper end of said compartment and movable into obstructing position as respects the passageway through said compartment, spring means urging said cut-off valve into open position; a pivotally mounted discharge control valve positioned near the lower end of said compartment and cooperating with said cut-off valve to form a measuring chamber therebetween, spring means urging said discharge control valve toward closed position, a lever connected with said cut-off valve, another lever connected with said discharge control valve, and cam means movable in the path of both of said levers, said cam means having a cam element positioned to engage first said cut-off valve lever and then said discharge control valve lever whereby said cut-off valve will first be closed and said discharge valve will then be opened, said cam having another cam element positioned to hold said cut-off valve closed during the time said discharge control valve is open.

5. In a measuring and dispensing device, a hopper having an opening in the bottom thereof; a measuring and dispensing unit having a compartment registering with said opening; means forming a pressure relief chamber near the upper end of the compartment of said measuring and dispensing unit and a cut-off valve in the upper portion of said compartment pivotally movable toward and away from said pressure relief chamber, whereby packing of material is avoided and ease of operation of said cut-off valve insured.

6. In a measuring and dispensing device, a hopper having inclined bottom walls converging toward a bottom opening, another inclined wall divergent relative to one of said inclined hopper walls and cooperating with said hopper wall to form a pressure relief chamber having an opening adjacent the discharge opening of said hopper, means forming a measuring compartment below said hopper in communication with said hopper and said pressure relief chamber, an inclined wall in prolongation of the last mentioned inclined wall of said relief chamber and extending into said measuring compartment and having a substantially vertical lower end portion, a discharge control valve pivoted for swinging movement adjacent the lower end of said vertical wall portion, a cut-off valve pivoted for swinging movement adjacent the upper end of said measuring compartment and movable toward said pressure relief chamber to obstruct the passage of material through said measuring compartment, whereby material which is crowded to one side by the closing movement of said cut-off valve may enter said pressure relief chamber without being packed and without offering substantial resistance to the movement of said cut-off valve.

7. In a measuring and dispensing device, a hopper having a convergent hopper shaped bottom end and having an opening therein; a measuring and dispensing unit having a compartment registering with said opening; means forming a pressure relief chamber in the bottom of said hopper and in communication with said compartment; a cut-off valve pivoted for swinging movement in the upper portion of said compartment; spring means yieldingly urging said cut-off valve toward open position, said cut-off valve being movable toward the open end of said pressure relief chamber when it is moved toward closed position; a discharge control valve at the lower end of said compartment cooperating with said cut-off valve to form a measuring chamber and a valve operating lever common to both of said valves.

JAMES E. MILES.